Figure 1:
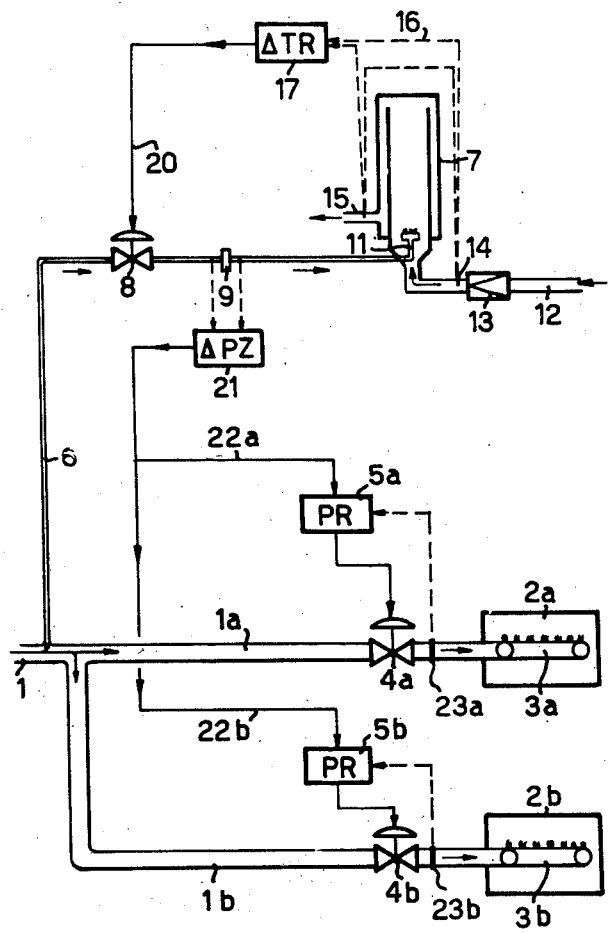

United States Patent Office 2,780,414
Patented Feb. 5, 1957

2,780,414
HEAT INPUT STABILIZATION

Henri J. De Heer, Geleen, Netherlands, assignor to Stamicarbon N. V., Heerlen, Netherlands Application November 23, 1953, Serial No. 393,898

Claims priority, application Netherlands November 27, 1952

9 Claims. (Cl. 236—15)

The present invention relates to a method of and apparatus for the stabilization of the heat input by a gaseous fuel of changing calorific value and density to one or more installations, e. g., furnaces, which is (are) to burn the said fuel.

The invention is applicable, e. g. for stabilizing the heat output of gas-heated furnaces, such as Siemens-Martin furnaces, or coke oven batteries, where the fuel used consists of a mixture of several gases, such as Blau gas, coke oven gas, oxygas and residual gas, i. e., coke oven gas which has entirely or largely been stripped of hydrogen.

When a furnace or other installation is stoked with a gas of a constant calorific value and density, it generally suffices for controlling the heat input to the installation, to regulate the gas pressure. It is true that also the temperature of the gas and the atmospheric pressure have an influence on the heat produced during the combustion of the gas, but as a rule these factors are subject to minor fluctuations only, so that in general the control of the pressure as aforesaid, is sufficient.

Also in case the fuel gas changes in calorific value but has a practically constant density, pressure control may be applied, although the control should be governed in dependence on the results of a continuous measurement of the calorific value of the fuel gas (so-called calorific value control).

However, when stoking with a gas which changes both in calorific value and density, the pressure of the gas is, by itself, no longer a true measure of the heat input.

As a rule the mixing ratio of the component gases is not easy to control since the supply of these component parts is entirely or partly dependent on certain working conditions, which it is not possible to alter quickly for purposes related to the stoking of the furnace or other installation.

A direct measurement of the heat output of or in the installation(s) is not generally feasible; for example the temperature of a coke oven battery fluctuates continuously depending on the stage of the coking process in the oven.

In the last-mentioned cases, therefore, another kind of control is needful (so-called heat input control).

In practice, moreover, a special problem is encountered, when stoking two or more large installations or two or more groups of smaller installations using the same gas supply source. Then, it is essential for the gas flow to each installation or group of smaller installations to be controlled separately, in order that the fluctuations in the line resistance or pressure impulses, as may occur for example when a large installation is being cut off or switched over, may be counteracted.

According to the present invention the heat input by a gaseous fuel of changing calorific value and density to one or more installations is stabilized by burning gas branched from the (common) installation supply line in a dummy heater, regulating the gas flow to the dummy heater as to production of a constant heat output and, thus, for a constant heat input and deriving regulating signals from the dummy heater system for proportionally controlling separately the gas flow to the (each) installation.

The invention will be fully and readily understood from the following description in which, with reference to the accompanying drawings, two preferred embodiments of the invention are set forth.

Figure 2:
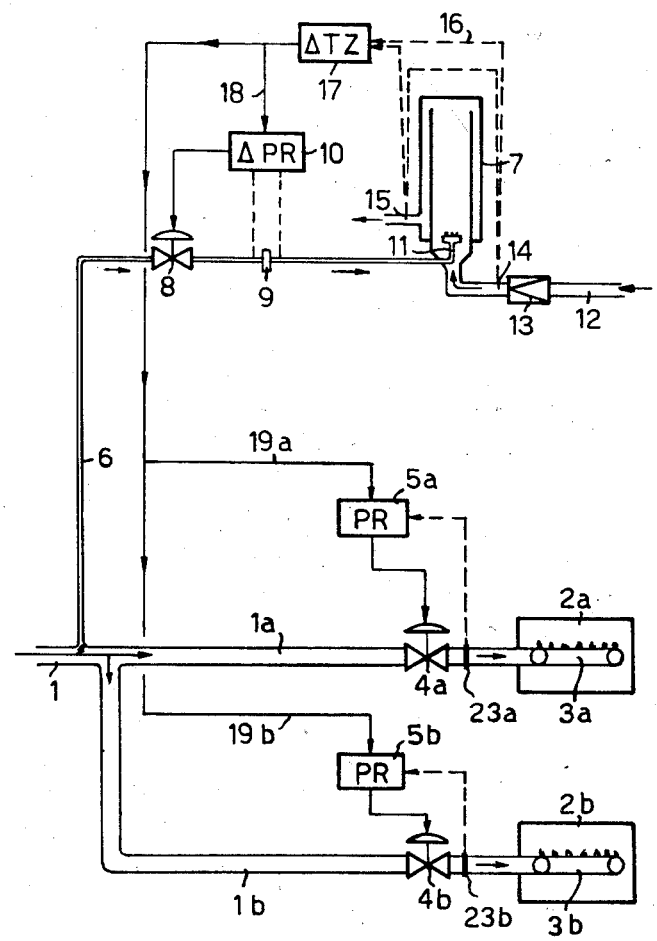

Referring to Figs. 1 and 2 of the drawings, the installations in the illustrated embodiments are two ovens 2a and 2b provided with burners 3a and 3b. Fuel gas, which may change in calorific value and density, is supplied under pressure to the ovens via a gas pipe 1, and branch pipes 1a and 1b.

In order to make the supply of gas to the ovens independent of possibly fluctuating pressure losses in the supply pipes and of pressure impulses as may occur for example when one of the ovens is cut off, the gas flow to each of the ovens is controlled by means of control valves 4a and 4b which are operated by valve regulators 5a and 5b which are influenced by signals transmitted by pressure gauges 23a and 23b connected with the gas lines 1a and 1b behind the control valves 4a and 4b.

Connected to the main pipe line 1 is a branch 6, through which fuel gas can pass from the said main line to a dummy oven 7. The oven has a burner 11, which is so constructed that even when the calorific value of the gas changes considerably, complete combustion of the gas takes place and no backfiring of the flame or flames occurs. The oven is designed so that a constant flow of a cooling agent, the rise in temperature of which can be measured, can be passed therethrough. An excess of combustion air is used as the cooling agent, as is illustrated diagrammatically in the drawings. The combustion air is delivered through a pressure air line 12 via the reducing valve 13. The temperature rise of the air employed as cooling agent is measured with a thermocouple 16, the junctions 14 and 15 of which are placed in the air path.

Mounted in the gas supply line 6 to the dummy oven 7 is a regulating valve 8 and a metering orifice 9, the latter being disposed behind the regulating valve 8, so as to respond to the mechanical conditions of gas flow to the dummy oven 7 as influenced by said regulating valve 8.

Referring now more particularly to Figure 1 of the drawings, the measuring signals of the thermocouple 16 are transmitted to a temperature differential regulator 17. The regulating valve 8 is governed by the output signals from said temperature differential regulator which are transmitted via 20.

In this way the heat output of the dummy oven and hence also the heat input to said dummy oven are kept constant within the technical regulation range.

Changes in the pressure difference measured across the meternig orifice 9 are converted into output signals by the pressure differential transmitter 21, which signals are transmitted, via 22a and 22b, to set point adjusting mechanisms with which the valve regulators 5a and 5b are provided, which set point adjusting mechanisms have a linear response. By selecting the proper metering orifice 9 and the proper pressure gauges 23a and 23b it is attained furthermore that the transmitting function of the pressure differential transmitter 21 and the measuring functions of the valve regulators 5a and 5b will respond in a proportional manner to the mechanical flow conditions in the appertaining gas supply lines.

In this way it is achieved that the gas flow to each oven is always directly proportional to the gas flow to the dummy oven. Since, as above indicated, the gas flow to the dummy oven is regulated as to obtain a constant heat input, while moreover the ovens burn the same gas as the dummy ovens and the potential supply of calories is based on the same physical laws in all cases, the heat input to each of the ovens is also constant.

The desired actual magnitude of heat input to each oven may be adjusted by pre-setting the set point adjusting mechanism of the valve regulators $5a$ and $5b$, respectively.

If desired, a predetermined programme of heat input may be realised by means of time schedule controllers (not shown) co-actuating the set point adjusting mechanisms of the said valve regulators.

With the embodiment of the invention according to Figure 1 it is essential that the system consisting of dummy oven 7, thermocouple 16 and temperature differential regulator 17 is so rapidly responding that sudden pressure variations which might occur in the gas supply line 6 to the dummy oven 7 are swiftly counteracted by way of a timely action of the valve regulator 8.

If, however, very sudden pressure variations in the gas supply line to the dummy oven are to be expected and it is preferred to totally exclude the possibility that such variations would not be counteracted swiftly enough by the dummy heater regulation system according to Figure 1, it is preferred to primarily regulate the gas flow to the dummy oven by means of a valve regulator responsive to the mechanical flow conditions in the said gas supply line, and influencing the set point adjusting mechanism of said valve regulator in dependence on variations in the heat output of the dummy oven.

The preferred embodiment of the invention in which said method is realized is shown in Figure 2 of the drawings, which figure will now be described further in details not yet treated hereinbefore.

The measuring signals of the metering orifice 9 are here transmitted to a pressure differential regulator 10 provided with a set point adjusting mechanism; this regulator adjusts the regulating valve 8 in such a way as to keep the value of the pressure difference measured across the metering orifice 9 as nearly as possible equal to the desired value coresponding to the set point of the regulator 10.

The adjustment of the set point of the pressure differential regulator 10 is controlled automatically, via 18, by the signals from the temperature differential transmitter 17 to which the measuring signals of the thermocouple 16 are transmitted. The thus obtained cascade regulation ensures that within the technical regulation range, a constant heat output of and, consequently, a constant heat input to the dummy oven 7 is maintained.

The regulating signals of the temperature differential transmitter 17, in addition to being transmitted to the pressure differential regulator 10, are simultaneously used, after being linearly amplified if desired, to influence the set points of the valve regulators $5a$ and $5b$ by which the flow of the fuel gas supplied to the ovens is controlled. The said valve regulators are provided with set point adjusting mechanisms which, as well as the set point adjusting mechanism of the pressure differential regulator 10 used for regulating the dummy oven, show a linear response to the regulating signals transmitted from the temperature differential transmitter 17.

As, furthermore, the metering orifice 9 and the pressure gauges $23a$ and $23b$ are so chosen as to ensure a proportional response of the measuring functions of the regulators, 10, $5a$ and $5b$, respectively, to the mechanical flow conditions in the appertaining gas supply lines, it is again achieved that the gas flow to each oven is always proportional to the gas flow to the dummy oven.

It will be understood that the simultaneous utilisation of the signals from the temperature differential transmitter 17 for influencing the set points of the valve regulators in the gas supply lines to the respective ovens saves the necessity of inserting a second metering orifice in the gas supply line to the dummy oven and of an appertaining pressure differential transmitter as are shown in Figure 1.

The regulation as obtained in the illustrated embodiments may be effectuated in various ways. The various regulating signals may be transmitted, e. g., by mechanical linkages, or hydraulically or pneumatically as desired, the actual mode of transmission being selected in a given case, e. g., according to the size of and the distance between the installations to be controlled and according to the character of the industry in which the automatic control is being employed.

The dummy oven 7 may be constructed in different ways. For example, it is possible in principle to provide the oven with a heat exchanger through which a constant liquid current can be passed. It is preferred, however, to employ an excess of combustion air as the cooling agent, since in this case there is no possibility of a change in the heat transfer efficiency taking place due to corrosion etc. A purification of the fuel gas which otherwise might be necessary, as well as the attendant time lag which steps in with a heat exchanger as aforesaid, may in this way be avoided. Owing to the direct heat transfer, the response time can be kept short, for example below 0.5 secs. In order to utilise this short response time as much as possible, it is preferred to provide the thermocouple 16 with bare junctions placed in the air current.

It will be understood that the application of the invention for stabilizing the supply of potential heat to a furnace or other installation results in the stabilization of the heat output of the said installation where the gaseous fuel is entirely burned in the said installation.

I claim:

1. A method of maintaining constant heat input to a gas burning installation comprising the steps of effecting a main flow of gas of varying calorific value and density to said installation, continuously withdrawing a sample flow from said main gas flow, burning said gas flow, regulating said sample flow to effect constant heat output therefrom, and regulating said main flow of gas to said installation in proportion to said sample flow.

2. A method as defined in claim 1, wherein said sample flow is burned with a constant flow of excess air, and the sample flow is regulated in accordance with the temperature rise of said air.

3. A method as defined in claim 2, wherein said main flow of gas is also regulated in accordance with the temperature rise of said air.

4. A method of maintaining constant heat input to a plurality of gas burning installations comprising the steps of effecting a main flow of gas of varying calorific value and density, dividing said main flow of gas into a branch flow of gas to each of said installations, continuously withdrawing a sample flow from said main gas flow, completely burning said sample flow, regulating said sample flow to effect constant heat output therefrom, and regulating the branch flow of gas to each of said installations in proportion to said sample flow.

5. Apparatus for maintaining constant heat input to a gas burning installation comprising a main supply line to said installation, a dummy heater, a sample line leading from said main supply line to said dummy heater, first flow control means in said sample line, second flow control means in said main supply line between said sample line and said installation, means for automatically operating said first flow control means to maintain constant heat input to said dummy heater, and means for automatically operating said second flow control means to maintain the flow of gas therethrough proportional to the flow of gas through said first flow control means.

6. Apparatus for maintaining constant heat input to a plurality of gas burning installations comprising a main supply line, a branch line leading from said main supply line to each of said installations, a dummy heater, a sample line leading from said main supply line to said dummy heater, first flow control means in said sample line, second flow control means in each of said branch lines, means for automatically operating said first flow control means to maintain constant heat input to said dummy heater, and means for automatically operating each of said second flow control means to maintain the flow of gas therethrough proportional to the flow of said gas through said first control means.

7. Apparatus for maintaining constant heat input to a gas burning installation comprising a main supply line to said installation, a dummy heater, a sample line leading from said main supply line to said dummy heater, first flow control means in said sample line, second flow control means in said main supply line between said sample line and said installation, means for supplying a constant flow of excess air to said dummy heater, means for sensing the temperature rise of said air, means for operating said first flow control means in accordance with variations in the temperature rise of said air whereby the heat input to said dummy heater remains substantially constant, and means for automatically operating said second flow control means to maintain the flow of gas therethrough proportional to the flow of gas through said first flow control means.

8. Apparatus for maintaining constant heat input to a gas burning installation comprising a main supply line to said installation, a dummy heater, a sample line leading from said main supply line to said dummy heater, first flow control means in said sample line, second flow control means in said main supply line between said sample line and said installation, means for supplying a constant flow of excess air to said dummy heater, means for sensing the temperature rise of said air, a temperature differential regulator responsive to variation in such temperature rise, said temperature differential regulator being operatively connected with said first flow control means whereby the heat input to said dummy heater remains substantially constant, a pressure differential transmitter responsive to variation of flow in said sample line, and a flow control regulator having a set point adjusting mechanism operatively connected with said pressure differential transmitter, said flow control regulator being operatively connected to said second flow control means to maintain the flow of gas therethrough proportional to the flow of gas through said first flow control means.

9. Apparatus for maintaining constant heat input to a gas burning installation comprising a main supply line to said installation, a dummy heater, a sample line leading from said main supply line to said dummy heater, a valve in said sample line, a valve in said main supply line between said sample line and said installation, means for supplying a constant flow of excess air to said dummy heater, means for sensing the temperature rise of said air, a temperature differential transmitter responsive to variation in such temperature rise, a pressure differential regulator having a set point adjusting mechanism operatively connected with said temperature differential transmitter, said pressure differential regulator being operatively connected to said sample line valve whereby the heat input to said dummy heater remains substantially constant, and a valve regulator having a set point adjusting mechanism also operatively connected with said temperature differential transmitter, said valve regulator being operatively connected to said supply line valve to maintain the flow of gas therethrough proportional to the flow of gas through said sample line valve.

References Cited in the file of this patent

UNITED STATES PATENTS

| | | |
|---|---|---|
| 2,285,866 | Markle | June 9, 1942 |
| 2,349,521 | Schmidt | May 23, 1944 |

FOREIGN PATENTS

| | | |
|---|---|---|
| 322,305 | Great Britain | Dec. 5, 1929 |
| 888,469 | France | Sept. 6, 1943 |

OTHER REFERENCES

Principles of Industrial Process Control, by D. P. Eckman, first edition, published 1945, by John Wiley and Sons, pp. 194–197, inclusive.